UNITED STATES PATENT OFFICE 2,587,359

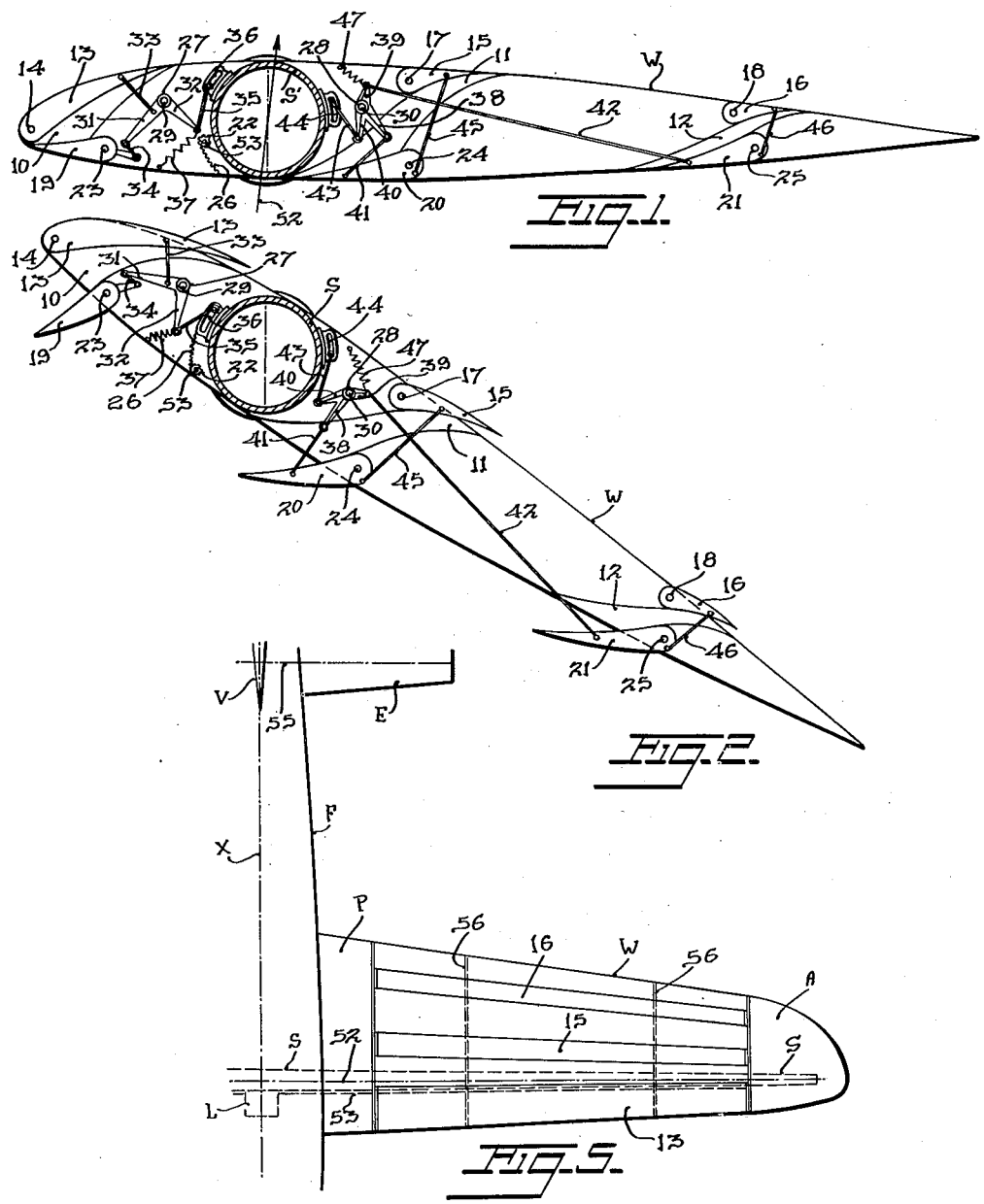

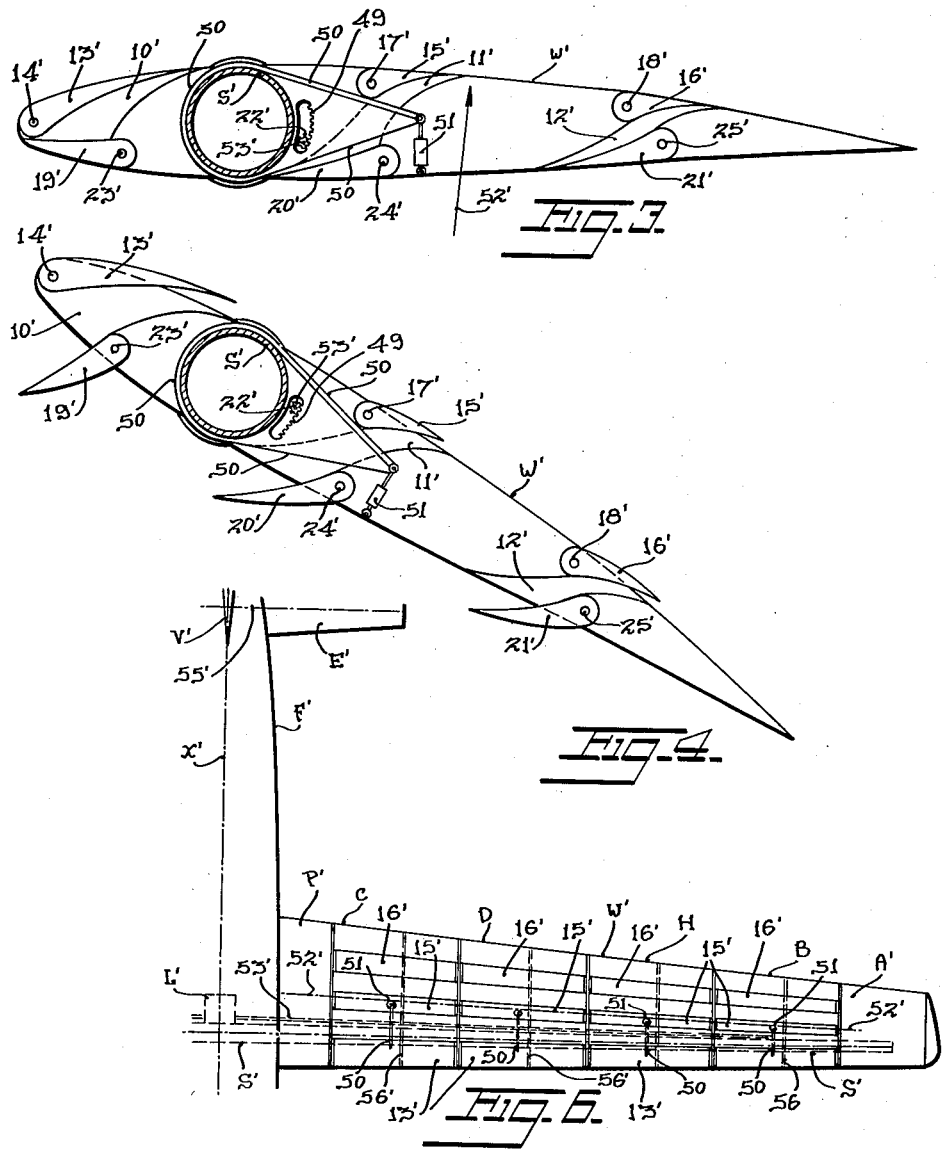

AIRPLANE WITH VARIABLE INCIDENCE SLOTTED WING AND ARROWLIKE BEHAVIOR ABOUT THE LATERAL AXIS

Serafín Justo Miláns, Montevideo, Uruguay

Application July 30, 1948, Serial No. 41,486

9 Claims. (Cl. 244—42)

This invention relates to new and useful improvements in an airplane with variable incidence slotted wing having arrow-like behavior about a lateral axis.

More particularly, the present invention proposes an improved airplane characterized by a special wing incorporating a single main-spar and mounted for controlled rotation about said spar to vary the angle of incidence of the wing, between zero and maximum lift positions, without at the same time angularly displacing the airplane's longitudinal axis from coincidence with the flight path; thereby making possible the use of a wing which reaches its maximum lift at very high angles of attack.

Another principal object of the invention is to provide such wing with high-lift producing slots extending spanwise thereof, and, in that connection, to provide simple, practical and dependable means not only for opening and closing said slots at a predetermined angle of wing incidence but also for controlling the rate of airflow through said slots at different angles of wing incidence.

Another important object of the invention is to provide arrangements whereby the benefits of the invention may be obtained regardless of which of two different positions is occupied by said spar along the length of the wing chord. One of these spar positions is at the center-of-pressure line of the wing at cruising speed. The other of said spar positions is forward of the center-of-pressure line at cruising speed, for co-action with an elastic suspension of the airplane's fuselage with regard to the wing.

Such an elastic suspension is one of the features of the present invention.

Another important feature of the invention is the novel use of an automatic-action tail elevator, without stabilizer, yet capable of coping with any existing pitch moments which may principally arise from shifting of the center-of-pressure line of the wing with regard to the center of gravity of the airplane or vice versa, thereby constantly maintaining the longitudinal axis of the airplane tangent to the flight path and, at the same time, always insuring best unrestricted forward visibility under all flight conditions.

Another distinguishing point of the invention is the way the pilot (through push or pull motion of the conventional pitch control whose movements act upon the so-called irreversible pitch-control unit, and not upon the tail elevator as is the case in all present-day airplanes) causes the wing to rotate correspondingly at controlled, variable rate-of-turn. Then, the airplane turns about its lateral axis as a consequence of the variation of the lift of the wing, and of the arrow-like behavior of its fuselage because of said elevator arrangement.

By means of said irreversible pitch-control unit the wing will either keep unchanged, at the will of the pilot, the fixed angle of incidence, or vary this angle (along the range of from nearly zero lift up to the maximum lift of the wing) so long as he acts upon the pitch control. Said variable rate-of-turn is necessary to better fit the wing lift to actual needs; as in the case, for example, of landing the aircraft.

With regard to the aforesaid elastic suspension of the fuselage from the wing, the saving of structural weight which this may additionally permit should be strongly emphasized. This saving may safely be had, because of the positive reduction of the gust and maneuvering load factors; with the result that it should be feasible to have C. A. A. regulations authorize structures in accordance with said saving, in the case, above all, of private light-weight airplanes, provided that any accelerations normal to the flight path, greater than say 1.5 g., be rendered impossible through appropriate limiting devices working in conjunction with the speed of flight.

Said elastic suspension, furthermore, is best adapted to make airplanes more economical in operation, through selection of higher aspect ratios for the wing, with all their beneficial influence upon general performance, and, above all, on climb and range, by further reduction of the induced drag.

With the foregoing and other objects in view, which will become more fully apparent as the nature of the invention is better understood, the same consists in an airplane with a rotatable slotted wing, the means for rotatably mounting the same (upon the basis of two different spar positions as aforesaid) the means for effectively controlling the rotation of the wing, the means for controlling the air flow through the wing slots, and the means for obtaining a constantly tangent attitude of the longitudinal axis of the fuselage relative to the flight path, all embodying the novel features of construction, combinations and arrangements of parts, as will below be more fully described, illustrated in the accompanying drawings and defined in the appended claims.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is generally a diagrammatic transverse sectional view through an airplane wing pursuant to the invention with its said spar at the center-of-pressure line of the wing at cruising speed; the wing shown being NACA 23012 airfoil, as representative of any wing with fixed center-of-pressure line.

Fig. 2 is a view similar to Fig. 1, showing said wing rotated to the angle of incidence corresponding to the $C_L$ maximum of the wing.

Fig. 3 is also a view similar to Fig. 1, but showing the wing spar forward of the center of pressure of the wing at cruising speed; the wing shown being NACA 2712 airfoil, as representative of any wing for variable center-of-pressure line.

Fig. 4 shows the wing of Fig. 3, but with the same rotated to the angle of incidence corresponding to the $C_L$ maximum of the wing.

Fig. 5 is generally a diagrammatic view fragmentary in top plan, showing a single-engined airplane with wing arranged for simple rotation.

Fig. 6 is a view similar to Fig. 5, showing a single-engined airplane with wing arranged for elastic suspension.

Fig. 7 is a diagrammatic view illustrating a tail elevator control.

Fig. 8 is a schematic representation of the pitch control, acting upon an irreversible pitch-control unit, and not upon the elevator as in the conventional airplane.

Preliminarily, it may be explained that the now favored mechanism for controlling the airflow through the wing slots is the same through both, the wings of Figs. 1 and 5 and that of Figs. 3 and 6 and consequently, while such mechanism is shown in Figs. 1 and 2, it has been omitted from Figs. 3 and 4, the better to allow in the two last mentioned views of a very clear showing of the now favored way of providing for an elastic suspension of the fuselage from the wing with the spar forward of the center-of-pressure line at cruising speed.

There is a strong reason why the qualifications "at cruising speed" is repeatedly stated. This is because, in the arrangement of Figs. 1, 2 and 5, it is impossible to predict the location of the center-of-pressure line consequent upon functioning of the slots, while, in the arrangement of Figs. 3, 4 and 6, the shifting condition of the center of pressure line of the employed airfoils, aggravated through the influence of the slots when they begin functioning, does not allow knowing the true position of the center-of-pressure line. Therefore, any showing of said line has been omitted in Figs. 2 and 4.

Referring to the drawings in detail, and first to the form of wing shown in Figs. 1, 2 and 5, W designates the wing, and S its spar suitably connected to the fuselage and on which spar the wing is suitably mounted for controlled rotation about the same; said spar being situated at the center-of-pressure line 52 at cruising speed.

The spar S may be of tubular torsion-resisting form and of as large a diameter as practicable, so as to combine lightness of weight with great torsion and bending strength. Said spar, of course, may be of any other appropriate construction.

The wing W is provided with a frontal slot 10, a central slot 11 and a rear slot 12, each of which extends along the span of the wing.

A frontal upwardly and rearwardly extending slat 13 defines the front of the frontal slot 10 and is forwardly hinged as at 14 to the wing W, so as to be swingable to open and close the upper rear end of said frontal slot. Similarly, the upper front portions of the central slot 11 and of the rear slot 12 are defined by deflectors 15 and 16, respectively, which are, as at 17 and 18 respectively, hinged to the wing W, for swinging movements to open and close the upper rear ends of said slots. The upper or outer surfaces of the slat 13, and of the deflectors 15 and 16, are so shaped as to form smooth even continuations of the upper surface of the wing when said elements are closed, and the under or inner surfaces of said slat and deflectors are so contoured as to form smooth even continuations of the walls defining the fronts of the slots 10, 11 and 12, respectively, when said elements are open.

Associated with the lower, front or inlet ends of the slots 10, 11 and 12 are traps or scoops 19, 20 and 21, respectively, which are suitably hinged, as at 23, 24 and 25 respectively, at their rear ends to the wing adjacent to the rear sides of the mouths of said slots. The under surfaces of said elements 19, 20 and 21 are so contoured as to form, when they are closed, smooth even continuations of the under surface of the wing, and their upper surfaces are so shaped as to form, when they are open, smooth even continuations of the rear walls of the slots 10, 11 and 12.

When the elements 19, 20 and 21 are open they extend downward and forward relative to the wing below the lower surface thereof, so that they act as scoops to direct air into and through the slots 10, 11 and 12.

While any appropriate means may be provided for changing the angle of incidence of the wing W, through its rotation about the spar S, one suitable means for this purpose may comprise a mechanical drive including a pinion 22 meshing with an arcuate rack 26 suitably fixed to the wing. Pinion 22 is mounted on a shaft 53 supported by bearings fixed to the spar S. Said shaft extends parallel with the spar, and, upon its rotation responsive to the action of the irreversible pitch-control unit L (Fig. 5) in correspondence with movements of the conventional pitch-control by the pilot, a corresponding rotation is imparted to the wing.

Fig. 5, illustrating the case represented cross-sectionally in Figs. 1 and 2, shows the wing W arranged to meet the requirements of simple rotation. There is only one rotatable wing panel, in addition to the fixed portion P of the wing. At 56 are shown merely two ribs within which lies the necessary linkage for controlling the action of the slots in accordance with wing rotation.

That linkage is for actuating the slat 13, the deflectors 15 and 16, and the scoops 19, 20 and 21, in response to rotation of the wing beyond the so-called "working range of closed-wing operation," below to be further considered; as may consist, as shown in Figs. 1 and 2 of a pair of bell crank levers 27 and 28, suitably pivoted to the wing as at 29 and 30, respectively, and suitably connected to the spar S and to said elements 13, 15, 16, 19, 20 and 21.

The bell-crank lever 27 may have two arms 31 and 32, with the arm 31 connected to the slat 13 and to the scoop 19 by rods 33 and 34, respectively, so that the frontal slat and the frontal scoop may be simultaneously opened and closed in correspondence with rotations of said lever. The other arm of said lever may be connected to the spar S by means of the rod 35 and suitable lost motion connection, such as shown at 36, so that the slat 13 and the scoop 19 are opened only after a predetermined angle of incidence is assumed by the wing, that is, after the wing attains the upper limit of the "working range of closed-wing operation," and so that these elements 13 and 19 are suitably closed when the wing being rotated back to lower normal angles of incidence passes said upper limit. The "working range of closed-wing operation" aims at making it possible for the pilot to maneuver the wing in closed, unmodified airfoil shape to perform all the normal maneuvers of takeoff, climb and flight, except gliding at very high angles of attack and landing.

The coil spring 37, anchored at one end to the W and connected at its other end, for example, to the arm 32 of the bell-crank lever 27, seeks always to swing said lever in a direction to close the frontal slot; the action of the spring being necessary because of said lost-motion connection 36, which is an idling factor within the working range of closed-wing operation during swing of the wing back to lower angles of attack.

Said bell-crank lever 28 may have three arms 38, 39 and 40, of which the arm 38 may be connected to the scoop 20 by a rod 41, and the arm 39 may be connected to the scoop 21 by a rod 42. The other arm 40 of said lever may be connected to the spar S by a rod 43 and a suitable lost-motion connection 44 similar to and for the same purpose as said connection 36; that is, so that the scoops 20 and 21 and the deflectors 15 and 16, by means of rods 41, 42, 45 and 46, respectively, will be simultaneously opened only after the wing assumes a certain fixed angle of incidence, and will be closed at the same certain fixed angle of incidence as assumed by the wing on being rotated back to a low angle of incidence characteristic of cruising conditions.

The coil spring 47, anchored at one end to the wing and connected at its other end, for example, to the arm 39 of the lever 28, seeks always to swing said lever in a direction to close the slots 11 and 12, its action being as necessary as is that of the spring 37, for the same reasons.

From the foregoing it will be apparent that all of the slat, deflectors and scoops are closed when the wing W is disposed at a cruising angle of incidence, within, broadly speaking, the so-called working range of closed-wing operation (which range will extend from zero lift up to nearly .7 of the maximum lift coefficient of the unslotted airfoil employed), and said slat, deflectors and scoops will remain closed throughout the said range; so that the airplane may perform all normal maneuvers, with its wing offering the least possible drag within said range, as has already been stated. It will equally be apparent that when the wing is rotated beyond said range, the slat, deflectors and scoops will be positively opened, proportionately to the increased angle of incidence of the wing, to permit flow of air through the slots 10, 11 and 12 in proper amounts best to assist the lift of the wing for any given angle of incidence beyond said range.

In Fig. 5, A represents the wig-tip aileron independently controllable as usual. L is, as aforesaid, the irreversible pitch-control unit under direct command of the pilot. F is the fuselage, X the longitudinal axis of the airplane, and V is the vertical tail-plane with rudder.

E represents the elevator without stabilizer, hinged as at 55, the turns of which in either direction will be permanently controlled by means of a weather-cock pivoted about a horizontal axis, situated forwardly of the airplane and far enough in advance to be free of any disturbing action from the wing or any other element of the airplane. Said weather-cock will detect any change of the wind in-flow-direction in a plane parallel to the plane of symmetry of the airplane, and will cause a corresponding rotation of the elevator, by means of an elevator-control-unit upon which the weather-cock will act, thus to keep unchanged the angle between said axis X and the flight path. The airplane will behave like an arrow about the lateral axis thereof.

The parts just above referred to are shown in Figs. 7 and 8, and will be referred to in more detail somewhat below.

Referring to Figs. 3, 4 and 6, a wing W' is here shown, with its spar S', corresponding to the spar S, located somewhere forward of the center of pressure line 52' of the wing at cruising speed. The elements here shown and to which are applied reference characters with primes, correspond to the elements of Figs. 1, 2 and 5 to which reference characters without primes are applied. Thus here a pinion 22' corresponds to a pinion 22; such a pinion 22' being here shown as meshing with a rack 49 formed as part of a lever 50. As shown in Fig. 6, there are a number of said levers 50, each operatively associated with an oleo-pneumatic shock absorber unit 51 suitably anchored to the wing W' and connected to the lever 50.

This wing W' is illustrated in Fig. 6 as including wing panels C, D, H and B, independent of each other, so as better to adapt the wing to the localized changing conditions of the turbulence of the air; each of the said levers 50, together with its associated parts as just mentioned, serving a different one of said wing panels C, D, H and B. Thus one possible means pursuant to the invention of giving an elastic suspension from the wing is provided.

In Fig. 7, K is the weather-cock, pivoted as at 54, suitably operatively linked to the control unit G, to which is also suitably operatively linked the elevator E pivoted as at 55.

In Fig. 8, J designates the hand wheel for controlling the ailerons, M is the pitch-control column pivoted as at I, and L is the irreversible pitch-control unit suitably operatively linked to M, which latter controls rotation of the shaft 53, which, as above explained, extends along the wing for driving the aforesaid pinion 22 meshing with a rack 26 pursuant to the showings of Figs. 1, 2 and 5, or for driving a pinion 22' meshing with a rack 49 pursuant to the showing of Figs. 3, 4 and 6.

While the three-slot arrangement is illustrated in the case either of the wing W or the wing W', there may be as many slots as is advisable on the basis of wind tunnel tests and other considerations.

The invention as illustratively embodied herein affords the full and unrestricted use of the outstandingly valuable very high-lift producing multi-slotted wing, with its revolutionary advantages in regard to the general performance of any airplane. As such a wing should yield a lift coefficient of perhaps 5.0 (for the full-span slotted wing), the use of unusually high wing-loadings in conjunction with higher aspect ratios for the wing, to improve the known ratio $C_L^3/C_D^2$, and thus the take-off and range, above all in the case of a multi-engined airplane with its engines mounted on the wing, will be a further contribution to yet higher speeds, much better range, and hence greater economy in the field of private, commercial, and even military airplanes. And if we consider reduction in landing speed, the new wing should afford such a substantial reduction as one of from 30 per cent to 40 per cent of the landing speed at full load of the present-day airplane.

The novel feature, revolutionary in itself, of the elastic suspension of the non-lifting parts of the airplane, i. e., fuselage, engine or engines and landing gear, plus the total load of the airplane, from the lifting element, the wing, introduces a new factor for greatly enhancing the comfort of flying, through a large reduction of the disagreeable vertical gust effects upon passengers and crew.

Because of the elastic link between any wing panel and the rest of the airplane through the action of the shock absorbers 51 (Figs. 3, 4 and 6), any change in the inflow direction or velocity of the air past any wing panel, will cause a corresponding variation of its lifting force, thus compelling the involved panel to swing up or down, depending on whether the then developed lift force is higher or lower than the previously exerted action of the corresponding shock absorber. A solution of this kind, moreover, is likely to be used in all present-day airplanes, if we only elastically mount an unslotted wing with back lying center-of-pressure, and control the rotation of the airplane about its lateral axis by means of the conventional tail assembly actuated directly by the pilot.

The airplane of the present invention is particularly advantageous as regards better climb (fuselage will always present to the air its minimum $C_D$), higher speed at any altitude because of the same reason, gliding from ($C_D/C_L$) minimum up to its worst value, even at uncommonly steep angles of glide, and always with best forward visibility in the direction of flight—which latter feature is almost wholly unknown in present-day airplanes. The new airplane will either attain a still greater speed of flight because of its reduced wing surface, or land at a considerably lower speed if the wing loadings used are those which are customary in today's airplanes.

From the foregoing, considered in connection with the accompanying drawings, it is believed that the features and advantages of the invention will be clearly understood and fully appreciated; such features being:

(1) The fundamental idea of the invention, that is, an airplane with a rotatable multi-slotted high-lift-producing wing;

(2) The construction, manner of mounting and mode of operation of the wing, with its spar mounted at the center of pressure line of the wing, and (3) The construction, manner of mounting and mode of operation of the wing, with its spar mounted forward of the center of pressure line of the wing, together with the elastic mounting of the airplane body with regard to the wing.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an airplane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spar, said two deflectors and said two scoops and controlled by rotation of the wing to act in unison with said first interconnecting means to move said two deflectors and said two scoops to open positions when said slat and first-mentioned scoop are moved to open positions.

2. In an airplane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spar, said two deflectors and said two scoops and controlled by rotation of the wing to act in unison with said first interconnecting means to move said two deflectors and said two scoops to open positions when said slat and first-mentioned scoop are moved to open positions, said manually controllable means for turning the wing, comprising an arcuate rack arranged concentric with the spar and connected to the wing, and a manually rotatable gear meshing with said rack.

3. In an airplane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spar, said two deflectors and said two scoops and controlled by rotation of the wing to act in unison with said first interconnecting means to move said two deflectors and said two scoops to open positions when said slat and first-mentioned scoop are moved to open positions, said manually controllable means for turning the wing, comprising an arcuate rack arranged concentric with the spar and connected to the wing, and a manually rotatable gear meshing with said rack, said arcuate rack being formed in a lever having an end connected to the spar, and a shock absorber unit connecting the other end of the lever to the wing.

4. In an airplane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spar, said two deflectors and said two scoops and controlled by rotation of the wing to act in unison with said first interconnecting means to move said two deflectors and said two scoops to open positions when said slat and first-mentioned scoop are moved to open positions, said first interconnecting means, comprising a bell-crank pivotally mounted within the wing forward of the spar, linkages connecting one of the arms of said bell-crank to said slat and said first-mentioned scoop, and a linkage connecting the other arm of said bell-crank to a fixed point on the spar to cause the bell-crank to be turned as the wing is turned relative to the spar.

5. In an airplane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spar, said two deflectors and said two scoops and controlled by rotation of the wing to act in unison with said first interconnecting means to move said two deflectors and said two scoops to open positions when said slat and first-mentioned scoop are moved to open positions, said first interconnecting means, comprising a bell-crank pivotally mounted within the wing forward of the spar, linkages connecting one of the arms of said bell-crank to said slat and said first-mentioned scoop, and a linkage connecting the other arm of said bell-crank to a fixed point on the spar to cause the bell-crank to be turned as the wing is turned relative to the spar, said latter-mentioned linkage including a lost-motion connection, whereby said bell-crank will be rotated to open said slat and first-mentioned scoop only after a predetermined angle of incidence has been assumed by the wing.

6. In an airplane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spar, said two deflectors and said two scoops and controlled by rotation of the wing to act in unison with said first interconnecting means to move said two deflectors and said two scoops to open positions when said slat and first-mentioned scoop are moved to open positions, said first interconnecting means, comprising a bell-crank pivotally mounted within the wing forward of the spar, linkages connecting one of the arms of said bell-crank to said slat and said first-mentioned scoop, and a linkage connecting the other arm of said bell-crank to a fixed point on the spar to cause the bell-crank to be turned as the wing is turned relative to the spar, said latter-mentioned linkage including a lost-motion connection, whereby said bell-crank will be rotated to open said slat and first-mentioned scoop only after a predetermined angle of incidence has been assumed by the wing, and a resilient means operating between said bell-crank and a fixed portion of said wing turning said bell-crank into a position in which said slat and said first-mentioned scoop will be closed overcoming the play in said latter-mentioned linkage created by said lost-motion connection.

7. In an airpane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spars, said two deflectors and said two scoops and controlled by rotation of the wing to act in unison with said first interconnecting means to move said two deflectors and said two scoops to open positions when said slat and first-mentioned scoop are moved to open positions, said second interconnecting means, comprising a bell-crank pivotally mounted within the wing rearward of the spar and having three arms, a link connecting one of the arms of said bell-crank to one of said two scoops, a link connecting another of the arms of said bell-crank to the other of said two scoops, links interconnecting said two scoops and said two deflectors to cause said deflectors to be moved to open positions when said two scoops are moved to open position, and a linkage connecting the third arm of said bell-crank to a fixed point on the spar to cause the bell-crank to be turned to open said two scoops as the wing is turned to change its angle of incidence.

8. In an airplane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spar, said two deflectors and said two scoops and controlled by rotation of the wing to act in unison with said first interconnecting means to move said two deflectors and said two scoops to open positions when said slat and first-mentioned scoop are moved to open positions, said second interconnecting means, comprising a bell-crank pivotally mounted within the wing rearward of the spar and having three arms, a link connecting one of the arms of said bell-crank to one of said two scoops, a link connecting another of the arms of said bell-crank to the other of said two scoops, links interconnecting said two scoops and said two deflectors to cause said deflectors to be moved to open positions when said two scoops are moved to open position, and a linkage connecting the third arm of said bell-crank to a fixed point on the spar to cause the bell-crank to be turned to open said two scoops as the wing is turned to change its angle of incidence, said linkage including a lost-motion connection, whereby said bell-crank will be turned only after a predetermined angle of incidence has been assumed by the wing.

9. In an airplane having a tubular spar extending laterally from the side of its fuselage and a wing rotatively positioned on the spar on a line coincident with the center line of pressure so that the wing can be rotated to vary its angle of incidence, manually controllable means for turning the wing, the wing being formed with spanwisely extending slots, one of said slots being located forward of the spar and two of said slots being located rearward of the spar, a pivotally mounted slat closing the upper end of said one slot located forward of the spar, a pivotally mounted scoop closing the bottom end of said one slot located forward of the spar, two pivotally mounted deflectors closing the top ends of the two slots located rearward of the spar, two pivotally mounted scoops closing the bottom ends of the two slots located rearward of the spar, means interconnecting said spar, said slat and said first-mentioned scoop and controlled by rotation of the wing for moving said slat and said first-mentioned scoop to open positions as the wing is rotated changing its angle of incidence, and means interconnecting said spar, said two deflectors and said two scoops and controlled by rotation of the wing to act in unison with said first interconnecting means to move said two deflectors and said two scoops to open positions when said slat and first-mentioned scoop are moved to open positions, said second interconnecting means, comprising a bell-crank pivotally mounted within the wing rearward of the spar and having three arms, a link connecting one of the arms of said bell-crank to one of said two scoops, a link connecting another of the arms of said bell-crank to the other of said two scoops, links interconnecting said two scoops and said two deflectors to cause said deflectors to be moved to open positions when said two scoops are moved to open position, and a linkage connecting the third arm of said bell-crank to a fixed point on the spar to cause the bell-crank to be turned to open said two scoops as the wing is turned to change its angle of incidence, said linkage including a lost-motion connection, whereby said bell-crank will be turned only after a predetermined angle of incidence has been assumed by the wing, and a spring operating between said bell-crank and a fixed portion of said wing turning said bell-crank into a position in which said two scoops and said two deflectors will be closed overcoming the play in said linkage created by said lost-motion connection.

SERAFÍN J. MILÁNS.

REFERENCES CITED

The following references are of record in the file of this patent:

UNITED STATES PATENTS

| Number | Name | Date |
|---|---|---|
| 1,040,533 | Esnault et al. | Oct. 8, 1912 |
| 1,280,195 | Eaton | Oct. 1, 1918 |
| 1,496,731 | Page | June 3, 1924 |
| 1,726,118 | Page | Aug. 27, 1929 |
| 1,810,693 | Alfaro | June 16, 1931 |
| 1,840,683 | Vance | Jan. 12, 1932 |
| 1,851,797 | Almeida | Mar. 29, 1932 |
| 1,856,093 | Ford et al. | May 3, 1932 |
| 1,885,571 | Wilson | Nov. 1, 1932 |
| 1,895,679 | McPherson | Jan. 31, 1933 |
| 1,935,824 | Upson | Nov. 21, 1933 |
| 1,956,755 | Constantin | May 1, 1934 |
| 2,063,030 | Crouch | Dec. 8, 1936 |
| 2,070,705 | Barnhart | Feb. 16, 1937 |
| 2,104,006 | Ballou | Jan. 4, 1938 |
| 2,147,360 | Zaparka | Feb. 14, 1939 |
| 2,243,885 | Schweisch | June 3, 1941 |
| 2,362,224 | Roseland | Nov. 7, 1944 |

OTHER REFERENCES

Warner "Airplane Design," 1st edition, page 149 (copy in Division 22).

Jane's "All The World's Aircraft" of 1935, pages 288c and 289c. (Copy in Division 22.)